United States Patent [19]
Espenschied

[11] 3,776,056
[45] Dec. 4, 1973

[54] GEAR SHIFTING ASSEMBLY FOR CHANGE-SPEED TRANSMISSION

[75] Inventor: Helmut Espenschied, Ludwigsburg, Germany

[73] Assignee: Robert Bosch GmbH, Stuttgart, Germany

[22] Filed: Aug. 4, 1972

[21] Appl. No.: 277,928

[30] Foreign Application Priority Data
Aug. 6, 1971 Germany................... P 21 39 346.4

[52] U.S. Cl..................................... 74/364, 74/335
[51] Int. Cl........................... F16h 3/08, F16h 5/06
[58] Field of Search.............................. 74/364, 335

[56] References Cited
UNITED STATES PATENTS
2,931,237  4/1960  Backus................................ 74/335
2,974,766  3/1961  Perkins et al..................... 74/335 X
3,422,939  1/1969  Henry-Biabaud.................. 74/364 X
3,570,636  1/1971  Franz et al. ................. 74/335 UX R
3,664,470  5/1972  Beech............................... 74/335 X Primary Examiner—A. T. McKeon
Attorney—Michael S. Striker

[57] ABSTRACT

A gear shifting assembly for changing the speed positions of transmissions in automotive vehicles has a double-acting gear shifting cylinder receiving oil by way of a directional control valve which is actuatable by oil in dependency on a pressure differential between the cylinder chambers. The directional control valve receives oil from a pump by way of an adapter valve which is controlled by an adjustable pressure regulating valve. The pressure of oil which moves the piston in the double-acting cylinder depends on the selected speed position of transmission and such pressure develops when the piston encounters a resistance to its movement in the cylinder.

10 Claims, 2 Drawing Figures

3,776,056

GEAR SHIFTING ASSEMBLY FOR CHANGE-SPEED TRANSMISSION

CROSS-REFERENCE TO RELATED APPLICATION

The gear shifting assembly of the present invention constitutes an improvement over and a further development of the gear shifting assembly which is disclosed in the commonly owned copending U.S. Pat. application Ser. No. 250,956 filed May 8, 1972 by Espenschied et al.

BACKGROUND OF THE INVENTION

The present invention relates to improvements in means for changing the speed positions of transmissions which are utilized in automotive vehicles or the like. More particularly, the invention relates to gearshift assisters or gear shifting assemblies which can be used to select and thereupon engage a selected speed gear of a change-speed transmission.

The copending U.S. Pat. application Ser. No. 250,956 of Espenshied et al. discloses a gear shifting assembly which employs a fluid-operated selector motor having a first double-acting piston which is movable between different axial positions to thereby move an axially and/or angularly movable displacing element into engagement with a selected shifting member of the change-speed transmission, a fluid-operated actuating motor having a second double-acting piston which is movable from a neutral position to one or two operative positions to thereby actuate the selected shifting member by way of the displacing element, and an electronic control unit which controls the valves serving to regulate the flow of fluid to and from the cylinders of the two motors. The axis of the first piston is preferably normal to the axis of the second piston.

SUMMARY OF THE INVENTION

An object of the invention is to provide a gear shifting assembly which can insure smooth engagement of speed gears in non-synchronized, mechanically synchronized and/or electronically synchronized change-speed transmissions.

Another object of the invention is to provide a novel and improved system of valves which regulate the flow of a pressurized fluid medium into the cylinder of the actuating motor in the gear shifting assembly of the type disclosed in the copending U.S. Pat. application Ser. No. 250,956.

A further object of the invention is to provide a gear shifting assembly wherein the force which is to be applied in order to engage a selected speed gear in the associated change-speed transmission can be determined in advance with a high degree of precision and reproducibility.

The invention resides in the provision of a gear shifting assembly for changing the speed positions of transmissions in automotive vehicles. The gear shifting assembly comprises a fluid operated gear selector motor having a first output element (e.g., the piston rod of a double-acting hydraulic cylinder) movable in a first direction to thereby select a speed position, and a fluid-operated gear shifting or actuating motor having a second output element (e.g., a reciprocable piston rod) movable in a second direction which is normal to the direction of movement of the first output element. The gear shifting motor further comprises a cylinder, a piston which is reciprocable in the cylinder and is connected to the second output element, two inlet ports provided in the cylinder at the opposite sides of the piston, and a plurality (for example, three) outlet ports provided in the cylinder and each controlled by a discrete normally closed shutoff valve. The piston is movable in the cylinder between a neutral position in which it closes one of the outlet ports and at least one operative position in which it closes another outlet port.

The gear shifting assembly further comprises a source of pressurized hydraulic fluid, a directional control valve which is connected with the inlet ports of the cylinder and admits fluid to that inlet port wherein the pressure is higher, an adapter valve (which is preferably a pressure regulating valve) connected between the source and the directional control valve, and an adjustable pressure regulating valve connected with the source and with the adapter valve to determine the pressure of fluid which is admitted to the directional control valve by way of the adapter valve in dependency on the selected speed position of the transmission and in response to development of a resistance to movement of the piston in the gear shifting motor.

The novel features which are considered as characteristic of the invention are set forth in particular in the appended claims. The improved gear shifting assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
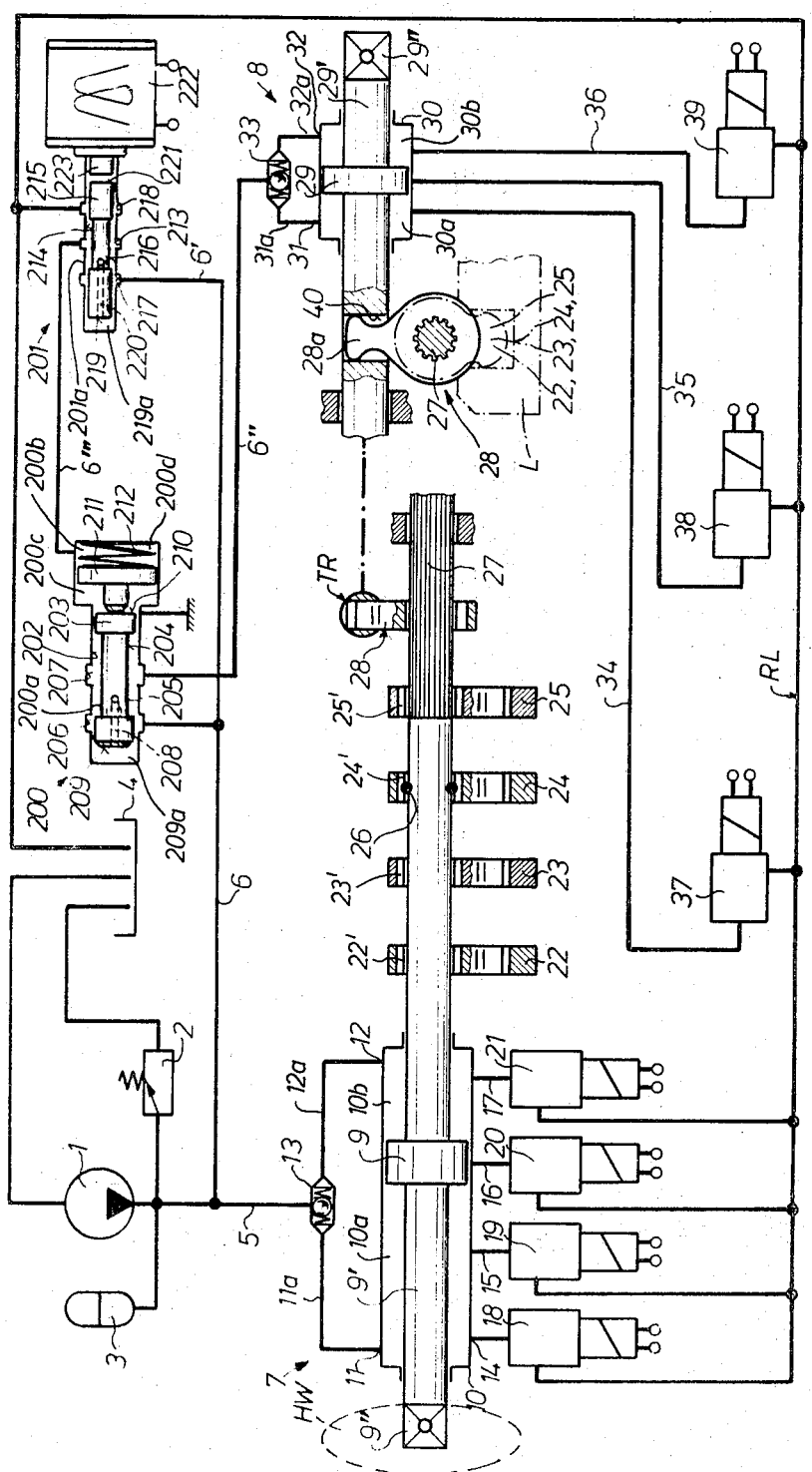
FIG. 1 is a diagrammatic partly sectional view of a gear shifting assembly for change-speed transmissions which embodies one form of the invention.

Referring first to FIG. 1, there is shown a gear shifting assembly which comprises three main components, namely, a source of pressurized fluid, a speed selecting or preshifting motor with associated valves, and a gear shifting or actuating motor with associated valves. The assembly further comprises an electronic control unit which produces shifting pulses for setting the change-speed transmission to a selected speed position. The details of the electronic control unit form no part of the present invention. A suitable control unit is disclosed in the copending U.S. Pat. application Ser. No. 162,339 filed July 14, 1971. For the sake of convenience, many of the reference characters shown in FIG. 1 are identical with those shown in FIG. 1 of the copending U.S. Pat. application Ser. No. 250,956.

The gear shifting assembly of FIG. 1 employs a source of pressurized hydraulic fluid (e.g., oil) which includes a pump 1 driven by an electric motor (not shown) and drawing fluid from a reservoir or tank 4. The pressure of fluid which is discharged by the pump 1 is limited by a relief valve 2 which opens a bypass to the reservoir 4 when the fluid pressure in a high pressure line 5 reaches a predetermined maximum permissible value. The source of pressurized fluid further comprises a suitable accumulator 3 which is connected with the high pressure line 5 and serves to compensate for eventual fluctuations in fluid pressure as well as to constitute an auxiliary source of pressurized fluid.

The high pressure line 5 connects the outlet of the pump 1 and the accumulator 3 with a fluid-operated speed selecting motor 7 through the intermediary of a directional control valve 13. A branch 6 of the high pressure line 5 indirectly connects the accumulator 3 and the outlet of the pump 1 with a fluid-operated gear shifting or actuating motor 8, again by way of a directional control valve 33 similar to or identical with the valve 13.

The speed selecting motor 7 (hereinafter called selector motor for short) comprises a hydraulic actuator cylinder 10 for double-acting reciprocable actuator piston 9 which is connected with an output element here shown as an elongated piston rod 9'. The latter extends beyond and is sealingly guided in both ends of the cylinder 10. Two pressure ports 11, 12 which are closely adjacent to the respective ends of the cylinder 10 at the opposite sides of the piston 9 are connected with the directional control valve 13 by way of conduits 11a, 12a and serve to admit pressurized fluid to the respective cylinder chambers 10a and 10b. The construction of the directional control valve 13 is such that it automatically connects the high pressure line 5 with that one of the cylinder chambers 10a, 10b wherein the pressure is or can be higher than in the other chamber. A directional control valve which can be utilized in the assembly of FIG. 1 to control the flow of pressurized fluid from the high pressure lines 5, 6 into the motors 7 and 8 is disclosed, for example, in German printed Pat. publication No. 1,815,915 and in the copending U.S. Pat. application Ser. No. 217,061 of Espenschied et al., filed Jan. 11, 1972.

The actuator cylinder 10 of the selector motor 7 is further provided with four fluid-discharging return ports 14, 15, 16 and 17 which are respectively controlled by normally closed electromagnetic shutoff valves 18, 19, 20 and 21, and are located in the path of movement of the piston 9 between the pressure ports 11, 12. The return ports 14-17 can admit fluid into the reservoir 4 by way of a return line RL.

The right-hand end portion of the piston rod 9' extends well beyond the respective end of the cylinder 10 and is rotatable in the openings or bores 22', 23', 24', 25' of four shifting members or fingers 22, 23, 24, 25 which form part of a change-speed transmission for an automotive vehicle. This end portion of the piston rod 9' is provided with at least one but preferably more than one (two) coupling or displacing element 26 which can establish a torque-transmitting connection between the piston rod 9' and a selected shifting member or finger when the displacing element 26 is moved into the respective bore 22', 23', 24' or 25'. Such axial shifting of the element 26 takes place in response to movement of the actuator piston 9 toward the pressure port 11 or 12 of the cylinder 10 in the selector motor 7. For example, the displacing element 26 may be provided with one or more external splines which can enter complementary grooves provided in the fingers 22, 23, 24 and 25 so that the respective finger is then compelled to share the angular movements of the piston rod 9'.

The rightmost portion of the piston rod 9' constitutes a splined shaft 27 which can be rotated by a tilting box here shown as a one-armed lever 28. The latter has internal grooves to receive the splines of the shaft 27 so as to allow the piston rod 9' to move axially to the extent which is necessary to move the displacing element 26 into register and torque-transmitting engagement with the finger 22, 23, 24 or 25. The lever 28 can be pivoted by a second output element or piston rod 29' which forms part of the actuating motor 8. The piston rod 29 is normal to and crosses in space with the piston rod 9' (see the true position of the piston rod 29' as shown at TR in FIG. 1). The right-hand portion of FIG. 1 shows the axis of the piston rod 29' in the plane of the drawing and the axis of the splined shaft 27 at right angles to such plane merely for the sake of clarity.

Each of the fingers 22, 23, 24, 25 is articulately connected with a shifter fork (not shown) by one or more links L, and each shifter fork straddles a sleeve or collar which can shift the corresponding speed gear of the change-speed transmission in an automotive vehicle.

The actuating motor 8 comprises an actuator cylinder 30 for a double-acting reciprocable actuator piston 29 which is rigid with the aforementioned piston rod 29'. The piston rod 29' extends beyond and is sealingly guided in both ends of the cylinder 30. The latter has two inlet ports or pressure ports 31, 32 which are connected with the directional control valve 33 by conduits 31a, 32a. Furthermore, the cylinder 30 is provided with three fluid-discharging return ports or outlet ports 34, 35, 36 which are respectively controlled by electromagnetic shutoff valves 37, 38, 39 and can discharge fluid into the return line RL which can convey such fluid back into the reservoir 4. The two chambers of the cylinder 30 are shown at 30a and 30b.

That portion of the piston rod 29' which is adjacent to the lever 28 has a recess or slot 40 for a suitably rounded (e.g., substantially spherical) end portion (28a) of this lever so that the latter can be pivoted clockwise or counterclockwise, depending upon whether the actuator cylinder 30 receives pressurized fluid by way of the pressure port 31 or 32.

The left-hand end portion 9" of the piston rod 9', as viewed in FIG. 1, is of polygonal outline and is provided with a diametrically extending opening or bore to facilitate the attachement of a wheel or analogous manually operated means HW (indicated by broken lines) which allows for manually induced movements of the displacing element 26 in the event of a failure of the hydraulic system. The wheel HW need not be permanently mounted on the end portion 9"; it can be attached only in an emergency. A similar polygonal or facetted right-hand end portion 29" of the piston rod 29' can also receive a wheel or analogous manually operated moving means which can be manipulated to pivot the lever 28 and to thus turn the piston rod 9'. For example, each of the end portions 9", 29" can be provided with one or more flats.

The directional control valve 33 is connected with a branch 6 of the high pressure line 5 by way of an adapter valve 200 which is controlled by a pressure regulating valve 201. The adapter valve 200 (hereinafter called adapter) comprises a body 200a which defines a space 202 for a reciprocable valve member or spool 203. The latter has a substantially centrally located circumferential groove defining with the body 200a a ring-shaped control chamber 204 one end of which is flanked by an annular surface 105 on the lefthand piston of the valve member 203. The body 200a is provided with a first internal annular groove 206 which constitutes an inlet and is connected with the branch 6, and with a second internal annular groove 207 which constitutes an outlet and is connected with the directional control valve 33 by an intermediate line 6".

The valve member 203 has a bore 208 whichh extends inwardly from its left-hand end face 209 and communicates with the control chamber 204. Thus, the fluid pressure in chamber 204 equals that in the chamber 209a adjacent to the end face 209. Pressure is created by the pump 1 and regulated by the relief valve 2. Up until this moment — when the valve member 203 is in the said position — this pressure is present in the chamber 209a of the valve 200, which lies in front of the end face 209, and builds up over the pressure line 6, the inlet 206 and the bore 208.

The right-hand end face 210 of the valve member 203 abuts against a plunger 211 which is biased against the valve member 203 by a helical spring 212 and is reciprocable in the cylindrical right-hand end portion 200b of the valve body 200a. The bias of the spring 212 can be assisted by pressurized fluid which flows in a line 6''' when the pressure regulating valve 201 establishes a path for the flow of fluid from an extension 6' of the branch 6 into the line 6'''. The left-hand chamber 200c of the end portion 200b communicates with the atmosphere and is sealed from the right-hand chamber 200a as well as from the chamber 204.

The pressure regulating valve 201 has a body 201a for a valve member or spool 215 which is reciprocable in a space 214. The central portion of the valve member 215 has a circumferential groove so that it defines with the body 201a a ring-shaped control chamber 216. The body 201a has a first internal annular groove 217 which constitutes an inlet and is connected with the extension 6', a second internal annular groove 213 constituting an outlet and connected to the line 6''', and a third annular internal groove 218 connected with the return line RL.

The left-hand end face 219 of the valve member 215 is provided with an axial bore 220 which connects the control chamber 216 with a chamber 219a at the left-hand axial end of the body 201a. The other end face 221 of the valve member 215 can be moved or arrested by an axially adjustable abutment 223 forming part of an electromagnetic servomotor 222.

The operation:

When the driver of an atuomotive vehicle produces a signal which is transmitted to the electronic control unit (not shown) in order to shift into another gear, the control unit automatically initiates a series of operations including disengaging the clutch (not shown), disengaging the previously used speed gear, selecting the desired speed gear, electronic synchronization, engaging the selected gear, and engaging the clutch. The selection and engagement of the desired speed gear are carried out by the assembly of FIG. 1 in the following way: The electronic control unit furnishes an electric control current to energize one of the normally deenergized (and therefore closed) shutoff valves 18–21, for example, the valve 19. Thus, the outlet 15 is connected with the return line RL and the pressure in the chamber 10a of the cylinder 10 drops. Consequently, the directional control valve 13 automatically connects the high pressure line 5 with the cylinder chamber 10b by way of the conduit 12a and port 12 so that the piston 9 moves in a direction to the left, as viewed in FIG. 1. The displacing element 26 moves toward and enters the bore 23' of the shifting member 23. The axial movement of piston 9 is braked by the rising fluid pressure in the chamber 10a so that the piston rod 9' is gradually decelerated and comes to a halt when it seals the outlet 15. Consequently, the pressure of fluid in the chamber 10a equals that in the chamber 10b whereby the directional control valve 13 closes by causing or allowing its valve member to assume a neutral position. The displacing element 26 couples the piston rod 9' with the selected shifting member 23 so that the latter is compelled to rotate in response to rotation of the shaft 27 by the piston rod 29'.

When the just described operation is completed, the electronic control unit transmits a signal which results in engagement of the selected speed gear. To this end, the signal from the control unit energizes one of the shutoff valves 37, 39. Since the pressure of fluid in the chamber 209a of the adapter 200 decreases in response to axial movement of the piston 29 as a result of opening of the valve 37 or 39, the plunger 211 is free to follow the bias of the spring 212 and to push the valve member 203 in a direction to the left, as viewed in FIG. 1. The pressure in chamber 209a decreases in response to a drop of pressure in the groove 207 which communicates with the chamber 209a by way of the bore 208. The extent of leftward movement of the valve member 203 is determined by the selected setting of the servomotor 222 which controls the axial position of the abutment 223 and hence the fluid pressure in the chamber 200d. The chamber 30a or 30b receives fluid by way of the line 6" and valve 33 until the piston 29 reaches the port 34 or 36, depending upon whether the control unit has opened the valve 37 or 39.

The valve member 203 establishes communication between the grooves 206, 207 of the valve body 200a so that the branch 6 of the pressure line 5 is connected with the intermediate line 6" by way of the control chamber 204 and the directional control valve 33 admits pressurized fluid to the chamber 30a or 30b of the cylinder 30 (depending upon whether the control unit has caused the opening of the valve 39 or 37). The piston rod 29' pivots the lever 28 which rotates the shaft 27 of the piston rod 9' and causes the shifting member 26 to displace the corresponding synchronizing sleeve or collar in the change-speed transmission.

The fluid pressure which is selected by the pressure regulating valve 201 remains unchanged so that the motor 8 causes a rapid movement of selected synchronizing sleeve. Consequently, the pressure of fluid in the intermediate line 6" decreases considerably.

As soon as the synchronizing sleeve is applied, i.e., as soon as the piston 29 encounters a resistance to further axial movement, the pressure in the line 6" increases very rapidly without any change in the position of the piston 29. The rising fluid pressure in the line 6" is propagated into the chamber 209a by way of the bore 208 and acts on the end face 209 to move the valve member 203 in a direction to the right whereby the spring 212 stores energy and the plunger 211 expels fluid from the chamber 200d by way of the line 6'''. The thus expelled fluid enters the chamber 216 and flows through the bore 220 into the chamber 219a to act upon the end face 219 of the valve member 215 so that the latter is moved toward and into engagement with the abutment 223 of the servomotor 222. Thus, the selected axial position of the abutment 223 determines the fluid pressure in the line 6".

As soon as the synchronizing sleeve is free to assume its operative position with the exertion of a small force (upon completion of the synchronizing step), the pressure in the line 6'' decreases abruptly with attendant drop of fluid pressure in the chamber 209a. Therefore, the spring 212 is free to move the plunger 211 which moves the valve member 203 in a direction to the left to its fully open position so that the fluid flowing from the branch 6 into the line 6'' and thence into the cylinder 30 brings about the final movement of selected synchronizing sleeve to the operative position in which the respective speed gear of the transmission is engaged.

The just described mode of operation insures a shifting which is necessary for mechanically synchronized transmissions; thus, the synchronizing sleeve is rapidly displaced and the force acting on such sleeve is built up to the value selected by the setting of the servomotor 222 while the sleeve performs a negligible movement. Once the pressure has been built up to the selected value, the sleeve is rapidly moved to its engaged position. As a rule, the servomotor 222 will select a relatively high fluid pressure for engagement of the first and second speed gears and a progressively lower fluid pressure for engagement of higher speed gears.

The servomotor 222 is an electromagnet which can produce varying forces independently of the position of abutment 223 depending on the strength of the applied current.

Figure 2:
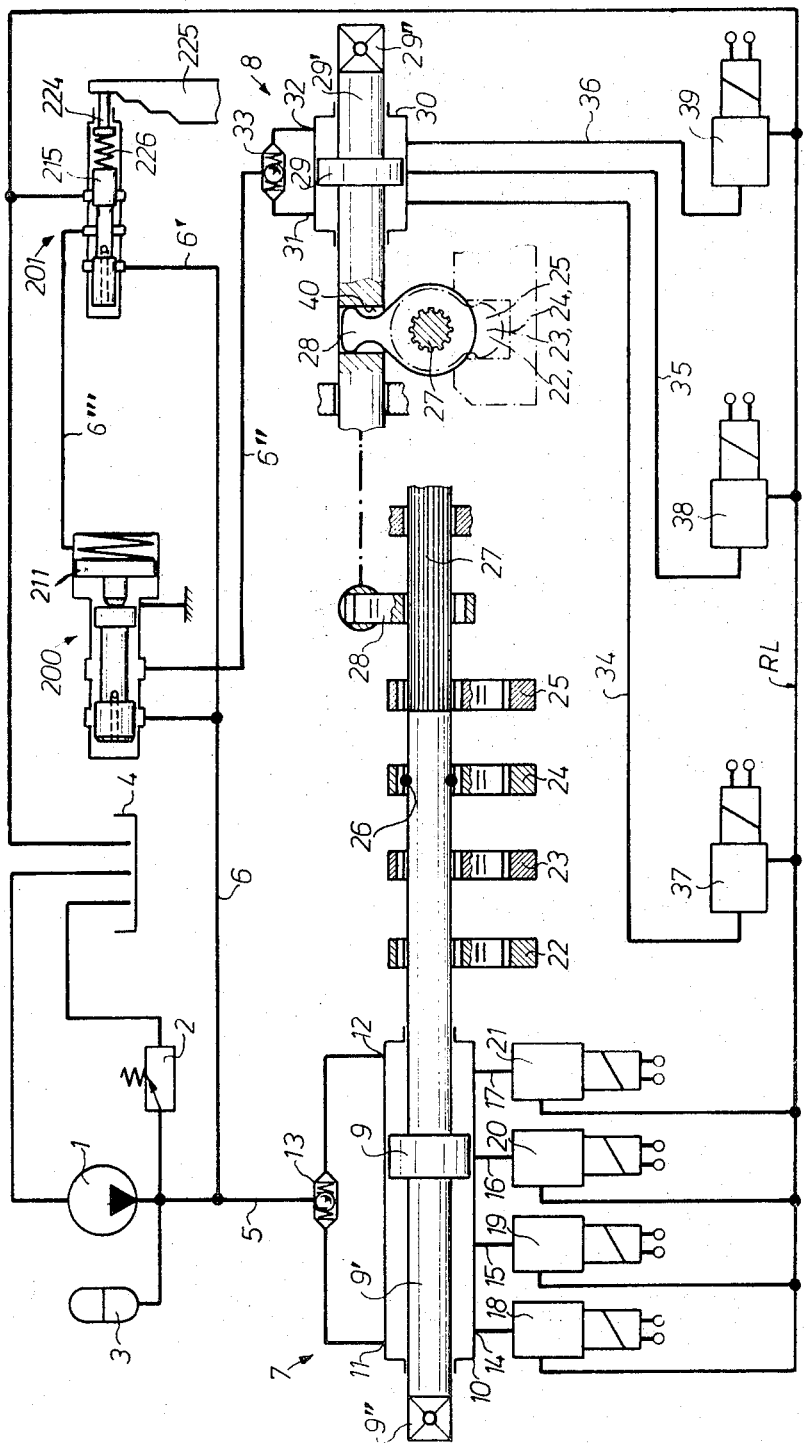
FIG. 2 is a similar view of a modified gear shifting assembly.

The shifting assembly of FIG. 2 is very similar to the assembly of FIG. 1. All such parts of the assembly of FIG. 2 which are clearly analogous to or identical with the corresponding parts shown in FIG. 1 are denoted by similar reference characters. The main difference between the two assemblies is that the servomotor 222 of FIG. 1 is replaced with a stepped cam 225 which can determine the position of a follower 224 corresponding to the abutment 223 of FIG. 1. The cam 225 receives motion from the piston rod 9' of the selector 7. The operative connection between the members 9' and 225 may comprise a link train, a gear train, a rack and pinion drive, a flexible shaft or the like. A helical spring 226 is interposed between the valve member 215 of the pressure regulating valve 201 and the follower 224.

The improved shifting assembly can be used with equal advantage in connection with electronically synchronized claw transmissions. The valve 200 opens when the claws are moved toward their engaged positions and closes to produce a preselected fluid pressure. For complete engagement of the claws, the valve 200 opens again. Such movements are initiated and controlled by electronic means. An electronically synchronized transmission is disclosed in the aforementioned copending U.S. Pat. application Ser. No. 162,339.

It is further clear that the novel features of the present invention can be incorporated in each of the embodiments of shifting assembly which are disclosed in the copending U.S. Pat. application Ser. No. 250,956. Thus, each of the shifting motors disclosed in U.S. Pat. Ser. No. 250,956 can be controlled in a manner as described in connection with FIG. 1 or 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. A gear shifting assembly for changing the speed positions of a transmission, comprising a fluid-operated gear selector motor having a first output element movable in a first direction; a fluid-operated gear shifting motor having a second output element movable in a second direction normal to said first direction, said gear shifting motor having a cylinder, a piston reciprocable in said cylinder and connected with said second output element, a pair of fluid-admitting ports provided in said cylinder at the opposite sides of said piston, and a plurality of outlet ports provided in said cylinder, said piston being movable in said cylinder between a neutral position in which said piston seals one of said outlet ports and at least one operative position in which said piston seals another of said outlet ports; a source of pressurized fluid; a directional control valve connected with said inlet ports; a normally closed shutoff valve provided in each of said outlet ports, said piston being movable in said cylinder to a position in which it seals that port whose shutoff valve is open in response to admission of pressurized fluid by way of said directional control valve; an adapter valve interposed between said source and said directional control valve; and an adjustable pressure regulating valve connected to said source and to said adapter valve to determine the pressure of fluid which is admitted to said directional control valve by way of said adapter valve in dependency on the selected speed position of the transmission and in response to development of a resistance to movement of said piston.

2. A gear shifting assembly as defined in claim 1, wherein said adapter valve comprises a body, a valve member reciprocable in said body and defining therewith an annular control chamber, said valve member having an annular surface at one end of said control chamber and a first end face defining with said body a second chamber communicating with said control chamber, the pressure of fluid in said second chamber being a function of the position of said valve member relative to said body and said valve member further having a second end face, and means for moving said valve member by way of said second end face under the control of said pressure regulating valve.

3. A gear shifting assembly as defined in claim 2, wherein said means for moving said valve member comprises a spring-biased plunger in said body.

4. A gear shifting assembly as defined in claim 3, further comprising conduit means connecting said body with said pressure regulating valve so that the fluid admitted into said body by way of said conduit means assists the spring bias upon said plunger.

5. A gear shifting assembly as defined in claim 1, wherein said pressure regulating valve comprises a body and a valve member received in said body and defining therewith an annular control chamber, said body having a fluid-admitting inlet connected with said source, a first outlet connected with said adapter valve and a second outlet, said valve member being movable in said body between first and second positions in which said inlet is respectively connected with said first and second outlets, said valve member having an end face defining with said body a second chamber communicating with said control chamber whereby the fluid pressure in said second chamber depends on the position of said valve member, said valve member further having a second end face and further comprising adjustable abutment means for said second end face.

6. A gear shifting assembly as defined in claim 5, further comprising resilient means interposed between said valve member and said abutment means.

7. A gear shifting assembly as defined in claim 5, further comprising means for adjusting said abutment means.

8. A gear shifting assembly as defined in claim 7, wherein said ajusting means comprises an electromagnetic servomotor.

9. A gear as defined in claim 7, wherein said adjusting means comprises a movable cam.

10. A gear shifting assembly as defined in claim 9, further comprising means for moving said cam in response to movement of said first output element.

* * * * *